(12) United States Patent
Patel et al.

(10) Patent No.: US 11,574,355 B2
(45) Date of Patent: Feb. 7, 2023

(54) SHOPPING CART WITH FEEDBACK

(71) Applicant: Walmart Apollo, LLC, Bentonville, AR (US)

(72) Inventors: Hiren K. Patel, San Jose, CA (US); Arunesh Joshi, Hayward, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 188 days.

(21) Appl. No.: 17/227,159

(22) Filed: Apr. 9, 2021

(65) Prior Publication Data

US 2021/0224881 A1 Jul. 22, 2021

Related U.S. Application Data

(63) Continuation of application No. 15/884,147, filed on Jan. 30, 2018, now Pat. No. 10,977,715.

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0623* (2013.01); *G06Q 30/0643* (2013.01)

(58) Field of Classification Search
None
See application file for complete search history.

(56) References Cited

U.S. PATENT DOCUMENTS

| 5,745,681 | A | 4/1998 | Levine et al. |
| 7,328,176 | B2 | 2/2008 | Tarvydas et al. |
| 10,684,738 | B1 * | 6/2020 | Sicora .................. G06F 16/435 |
| 2002/0052806 | A1 | 5/2002 | Hodson et al. |
| 2009/0125419 | A1 | 5/2009 | Barney |
| 2015/0088697 | A1 | 3/2015 | Garnepudi et al. |
| 2016/0104116 | A1 | 4/2016 | Greenberg et al. |
| 2018/0158056 | A1 * | 6/2018 | Williams ............. G06Q 20/208 |

* cited by examiner

*Primary Examiner* — Mila Airapetian
(74) *Attorney, Agent, or Firm* — Morgan, Lewis & Bockius LLP; Manita Rawat

(57) ABSTRACT

A system comprises at least one processor having a browser. The processor is configured for: receiving a request to purchase a first item (where a browser performs the receiving), displaying by the browser an indication that the first item has been added to a shopping cart of the user, before receiving an acknowledgement that the request has been received by a server, transmitting the request from the browser to the server, and receiving the acknowledgement of the transmitted request from the server after displaying the indication by the browser.

20 Claims, 4 Drawing Sheets

SHOPPING CART WITH FEEDBACK

CROSS-REFERENCE TO RELATED APPLICATIONS

This application is a continuation of, and claims priority to, U.S. patent application Ser. No. 15/884,147, filed on Jan. 30, 2018 and entitled "SHOPPING CART WITH FEEDBACK," which is hereby incorporated by reference in its entirety

FIELD

This application relates generally to networked computer systems and more generally to networked systems providing client processor interaction with a server database.

BACKGROUND

Online sales form a major component of electronic commerce. Online sales include a broad range of transactions, ranging from wholesale and business-to-business buying and selling to shopping web sites for direct retail sales to consumers. Each year, the share of retail sales from online retailing gains ground relative to brick-and-mortar stores.

In E-commerce web sites, a shopping cart is a program on a web server that allows visitors to select one or more items for eventual purchase. The shopping cart allows a customer to accumulate multiple items for purchase in a single order. When the customer selects an item for purchase using a client computer, the client computer transmits a request to the shopping cart service application executing in the seller's web server or cloud server. The shopping cart service application accesses an inventory database to determine whether the item is in stock. If the item is in stock, the shopping cart service application adds the item to a data structure representing the user's shopping cart. The shopping cart service application sends an acknowledgement to the client computer. The client computer can then provide an indication to the user that the item has been added to the shopping cart. For example, the browser of the client computer can display a graphic representing a shopping cart, with a numeral in the graphic indicating the number of items in the shopping cart. Once the shopping cart graphic in the client is updated, the customer can resume shopping.

SUMMARY

According to one aspect, a system comprises: at least one processor having a browser configured for: receiving a request to purchase a first item, where a browser performs the receiving, displaying by the browser an indication that the first item has been added to a shopping cart of the user, before receiving an acknowledgement that the request has been received by a server, transmitting the request from the browser to the server, and receiving the acknowledgement of the transmitted request from the server after displaying the indication by the browser.

According to another aspect, a method, comprises: receiving a request to purchase a first item, where a browser performs the receiving, displaying by the browser an indication that the first item has been added to a shopping cart of the user, before receiving an acknowledgement of receipt of the request from a server, transmitting the request from the browser to the server; and receiving the acknowledgement of the request from the server after displaying the indication by the browser.

According to another aspect, a non-transitory, machine-readable storage medium encoded with program instructions for execution by a processor, such that when the processor executes the program instructions, the processor performs a method, comprising: receiving a request to purchase a first item, where a browser performs the receiving, displaying by the browser an indication that the first item has been added to a shopping cart of the user, transmitting the request from the browser to a server after the displaying by the browser, and receiving the acknowledgement of the transmitted request from the server after displaying the indication by the browser.

DETAILED DESCRIPTION

This description of the exemplary embodiments is intended to be read in connection with the accompanying drawings, which are to be considered part of the entire written description.

Online customers can encounter a variety of delays when adding items to their online shopping cart. For example, when the customer selects the "add-to-cart" button on the display of the client computer, there is a first delay while a request is transmitted from the client to the shopping cart service application in the web server, a second delay while the server checks the availability of the item, a third delay waiting for the order to be committed in the order database, and a fourth delay while an acknowledgement of the order is transmitted from the server to the client. After the user clicks the add-to-cart button, the user waits until these four delays are completed before being able to return to shopping or check out. This slow system response may degrade the user's shopping experience.

This disclosure provides examples of systems and methods in which these delays can be eliminated, to provide the client immediate feedback upon selecting the add-to-cart control (e.g., button). The user feedback is generated within the client processor, by an agent of the online store operating on the client, or by a plug-in or applet for the online store operating within the client's browser.

In well-operating online web sites, the online catalog accurately reflects availability of inventory, so that items are only indicated as being "in-stock" when the items are, in-fact, in-stock. The instances in which an item is in stock when the user adds the item to their shopping cart, but sold-out when the user proceeds to check out, are rare. For example, a large retailer may have about a 99.5% probability of an item being in-stock at checkout time, if the item is indicated as in-stock when added to the customer's shopping cart. Based on this high rate of successful additions to users' shopping carts, upon a selection by the customer, the client computer can instantly provide the user feedback indicating that the item has been added to the user's shopping cart, without waiting for any acknowledgement from the cart service application or indication that the addition of the item has been committed to the cart service application database. In some embodiments, the feedback is provided to the user before the order is transmitted from the browser to the shopping cart service. The user can immediately return to shopping or select additional items without waiting for acknowledgement from the server. The client may receive the acknowledgement of the transmitted request from the server after the client displays the indication (that the item was added to the cart) in the browser. The server can add the item to the user's shopping cart in the background.

Figure 1:
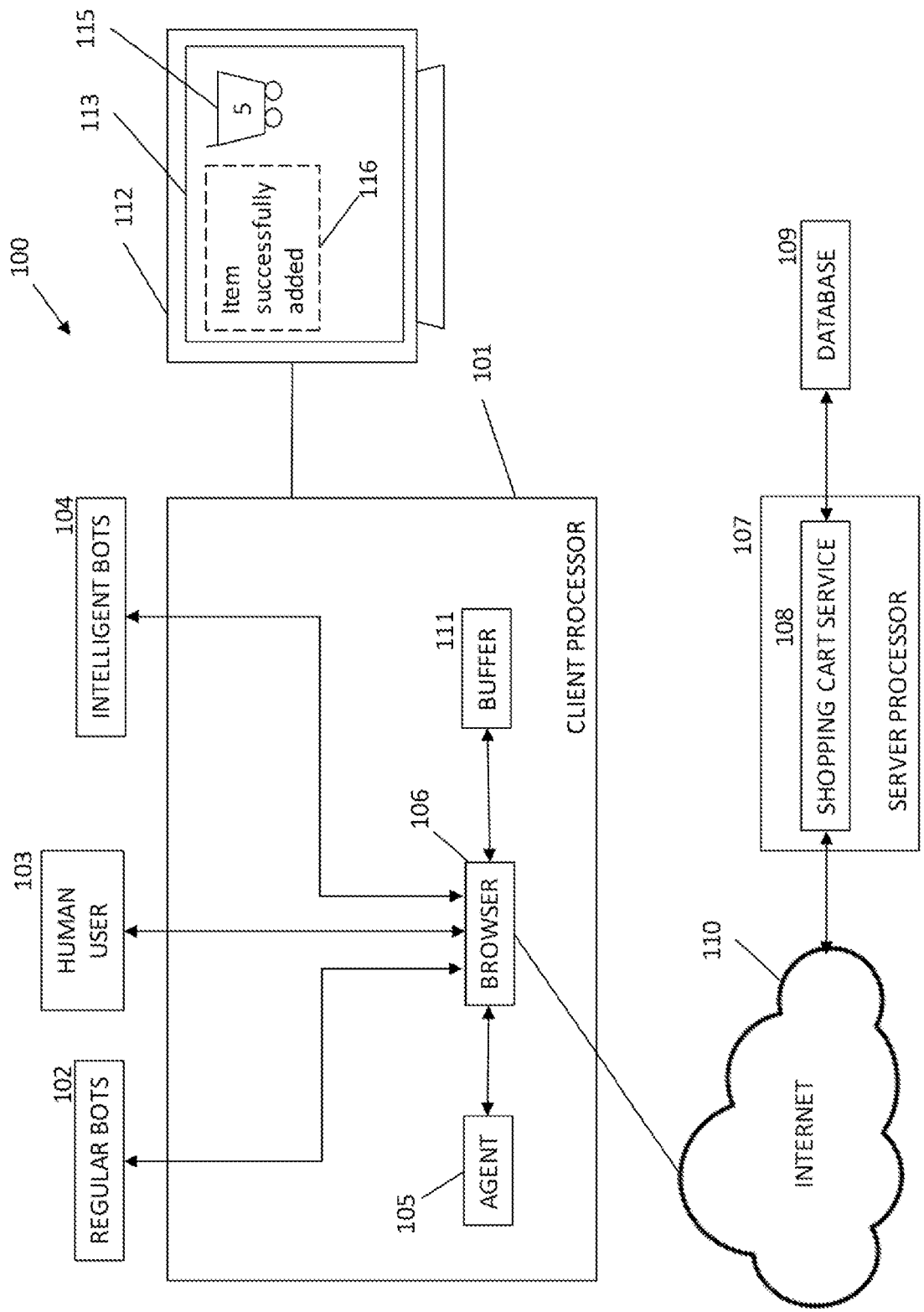
FIG. 1 is a block diagram of an exemplary system usable for online sales transactions.

FIG. 1 is a block diagram of an exemplary networked computing system 100 in which the method can be used. The system 100 comprises at least one client processor 101 having an interface, such as a browser 106 configured for visiting web pages and Internet sites, executing scripts (e.g., Java scripts) and interacting with cloud-based applications. The client 101 has an agent 105 of the shopping cart service application 108, which can be an applet (e.g., script or plug-in) launched by the browser 106 and displaying outputs in user interface window 113. The agent 105 is configured to receive a request from a user to purchase a first item and transmit the request from the browser 106 to a shopping cart service application 108 executing in a server 107. The agent 105 is considered to have received the request when the user selects "Add to Cart".

The display 112 of client processor 101 displays a graphical user interface 113, with which a user 103 can access online sellers' web sites. For example, the client processor 101 can provide software to initiate a session (e.g., a session with browser 106) for communication between the client processor 101 and the server processor 107. For example, in FIG. 1, the client processor 101 is in signal communication with a display 112. The display 112 shows an interface window 113, such as an online store client application within the display window corresponding to browser 106. The window 113 displays information about the user's shopping cart status. In some embodiments, the window 113 shows a graphic of a shopping cart 115 with the number of items (e.g., "5" in FIG. 1) in the electronic shopping cart shown abutting or inside the shopping cart 115.

In some embodiments, the browser 106 in client processor 101 initiates a hypertext transport protocol (HTTP) session allowing the server processor 107 to render seller web pages, receive customer orders, render shopping cart web pages, and render checkout web pages on the display 112 of client processor 101 for interaction between the user 103 and the shopping cart service 108. In some embodiments, the client processor 101 has an interface for human users in the form of a browser 106, which can also accept orders from intelligent bots 104 emulating a human user 103. A human user 103 or an intelligent bot (application) 104 has a valid customer identification (CID) capable of logging into the seller's cart service application 108. A bot 102, 104 is a software application that runs automated scripts over the Internet. A regular bot 102 cannot log into the seller's cart service application 108 with a valid CID, and is excluded from using the system 100. An intelligent bot 104 may be equipped with a valid CID and may be programmed to interact with the browser 106 for submitting orders to the seller via the shopping cart service application 108. The agent 105 of client processor 101 monitors interactions between the shopping cart service 108 and the browser 106, and updates information about the shopping cart displayed in the browser window 113.

In some embodiments, the agent 105 is configured for: detecting the receipt of an order request by the browser 106, and determining a count 115 of shopping cart items displayed by the browser 106 in window 113. In response to the receipt of the request by the browser 106, agent 105 transmits a signal for causing the browser 106 to increase the count 115 to reflect addition of the first item to the electronic shopping cart, before receiving the acknowledgement of receipt of the request from the server 107 (and in some embodiments, before transmitting the request to the server). The window (e.g., browser window 113) displayed by the browser 106 provides an indication that the first item has been added to a shopping cart 115 of the user, before receiving an acknowledgement of receipt of the request by the server 107. Subsequently, the request (or a batch request) is transmitted to the shopping cart application 108 in the server 107, and the shopping cart application 108 adds the item to the order database 109 of the server 107 in the background, after the browser 106 displays the indication 115 that the item has been added to the shopping cart. In other embodiments, the agent 105 is also configured to cause the interface (e.g., browser window 113) to display a message 116 that an item has been added to the shopping cart 115 before the browser 106 receives the acknowledgement.

The agent 105 is configured to cause the browser 106 to continue to display the first count 115 of shopping cart items in response to receiving an acknowledgement of the request from the server 107, until (a) a second item is added to the shopping cart, (b) the browser visits and displays the contents of the shopping cart, or (c) a checkout process is initiated for the shopping cart, whichever comes first. That is, upon receiving an acknowledgement of the request from the server 107, the agent 105 does not cause the count of items in shopping cart 115 to increase, because the agent 105 already increased the count in shopping cart 115 before the request (or batch request) was transmitted to the shopping cart service application 108.

In some embodiments, the client processor 101 comprises a buffer 111 for storing additional requests to purchase additional items. The agent 105 is configured for using the buffer 111 to throttle a rate at which a batch request is transmitted from the browser 106 to the server 107 (e.g., the number of batches per minute). In some embodiments, the agent 105 is configured to throttle the rate at which the agent 105 accept requests from a user 103 or intelligent bot 104. For example, the agent 105 can pause for a first predetermined period T1 after accepting and acknowledging (at the network level) a first request, before accepting and acknowledging a second request. By limiting the rate at which requests are accepted, the agent 105 avoids flooding the buffer 111 with requests. The buffer 111 allows the agent 105 to accept requests from an intelligent bot 104 at a rate greater than the rate at which the shopping cart service application 108 can accept requests from the buffer 111, in the short term, and even out the rate of transmitting requests (or batches) to the shopping cart service application 108. Thus, the throttling includes transmitting a batch reflecting the additional requests from the buffer 111 to the server processor at a different rate from (e.g., less frequently than) a rate of the storing in the buffer 111.

The buffer 111 can be any working memory used by the client processor 101 for short-term storage, such as primary memory (e.g., dynamic random access memory, DRAM), static dynamic random access memory (SDRAM), or registers. In some embodiments, the agent causes the browser to assemble a batch of requests (referred to herein as a "batch request") to add items to the electronic shopping cart. Each batch request includes all of the additional requests in the buffer 111 at the time when aggregation of the requests into the batch begins. The browser 106 is configured to transmit the batch request to the server 107 and then accumulate requests to be included in the next batch for a second predetermined time interval T2, so that a rate of transmitted requests or batch requests (e.g., number of requests per minute) does not degrade performance of the shopping cart service application 108. The performance of the shopping cart service 108 can be improved when the number of requests and/or batches is reduced (even if the size of each batch is larger).

The client processor 101 is in communication with one or more server processors 107 via a global communication network, such as the Internet 110, or a private network. The server applications may execute in a "MICROSOFT AZURE" platform developed by Microsoft Corporation of Redmond, Wash., or other cloud platform suitable for delivering software as a service.

The server processor 107 can be a web server or cloud server hosting a distribution application, such as an electronic commerce seller, an online retailer, a fulfillment center, or the like. The server processor 107 has a shopping cart service application 108, which receives and accumulates orders (interchangeably referred to herein as requests) from the client processors 101 for products or commodities (referred to herein as items) for clients to purchase. In the shopping cart metaphor, when the cart service application 108 receives a purchase request from the client processor 101, the accumulated item is added to the shopping cart of the user associated with an account into which the user is logged in. Upon checkout, the shopping cart service application 108 calculates and renders a display of the contents of the shopping cart, a total price for the order, including shipping and handling and any associated taxes. The shopping cart service 108 accesses a non-transitory, machine readable storage medium containing a database 109. The database 109 contains information regarding user accounts, orders, an online catalog of items, and inventory.

Figure 2:
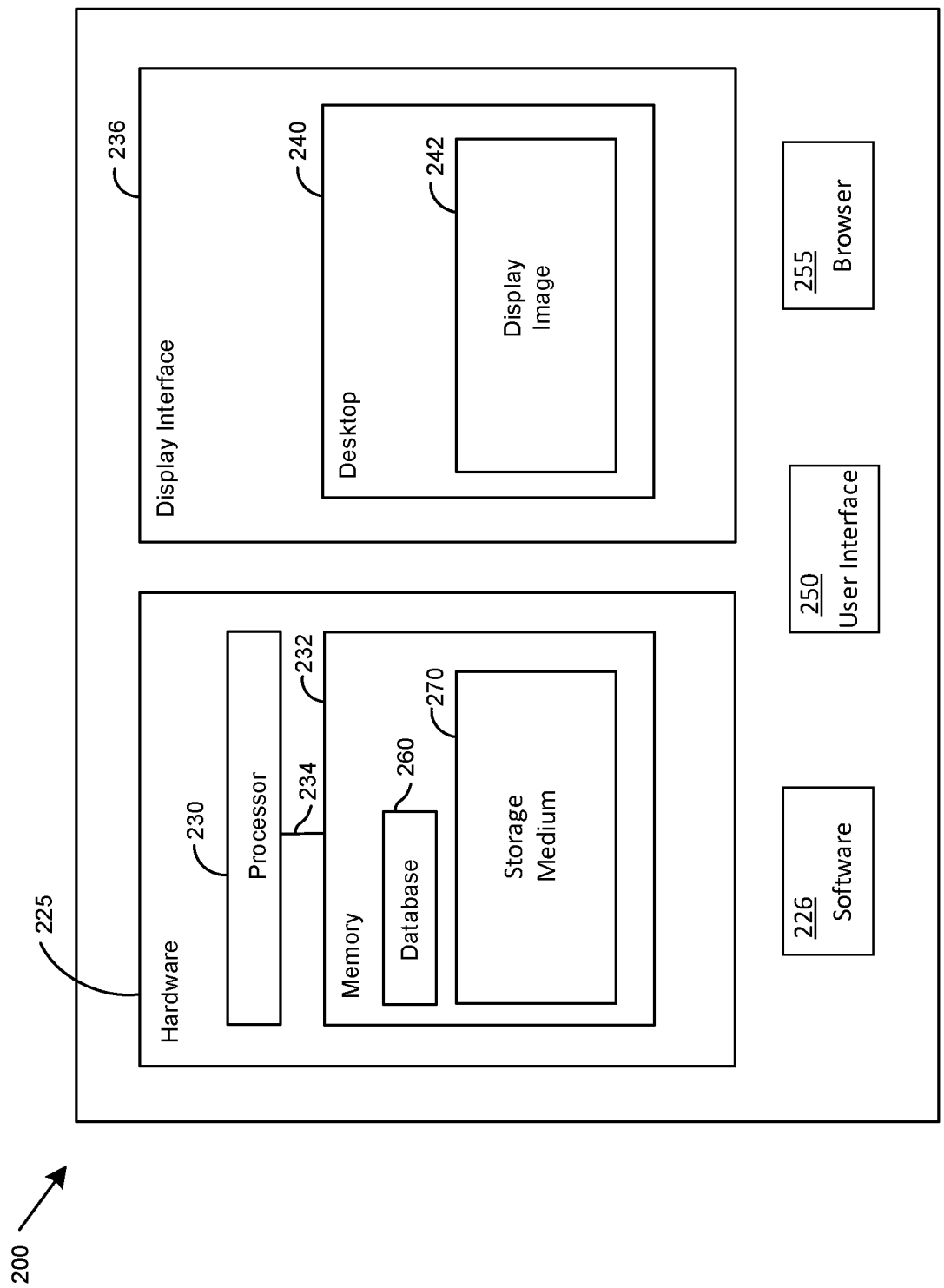
FIG. 2 is a block diagram of an example of the client processor of FIG. 1.

FIG. 2 is a block diagram of an exemplary computing device 200, which may be used to implement computing device 101 (FIG. 1) and/or server processor 107. In some embodiments, computing device 200 includes a hardware unit 225 and software 226. Software 226 can run on hardware unit 225 such that various applications or programs can be executed on hardware unit 225 by way of software 226. In some embodiments, the functions of software 326 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), a programmable gate array (PGA), and/or any other programmable circuit. Alternatively, processor 230 may include multiple processing units (e.g., in a multi-core configuration). The above examples are exemplary only, and, thus, are not intended to limit in any way the definition and/or meaning of the term "processor."

Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (NIC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used. Computing device 200 can also include a web browser 255, such as "CHROME" from Google, LLC of Mountain View, Calif., "SAFARI" from Apple Inc. of Cupertino, Calif., "FIREFOX" from Mozilla Foundation of Mountain View, Calif., or the like. The web browser 255 (referred to below the browser) is a software application for retrieving, presenting and traversing information resources on the World Wide Web or a web server in a private network. The browser 255 can render content (e.g., images), audio, video, and XML files, and may have plug-ins to support Flash applications and Java applets. An information resource is identified by a Uniform Resource Identifier (URI/URL) that may be a web page, image, video or other piece of content.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein, e.g., steps of the process shown in FIG. 4.

Figure 3:
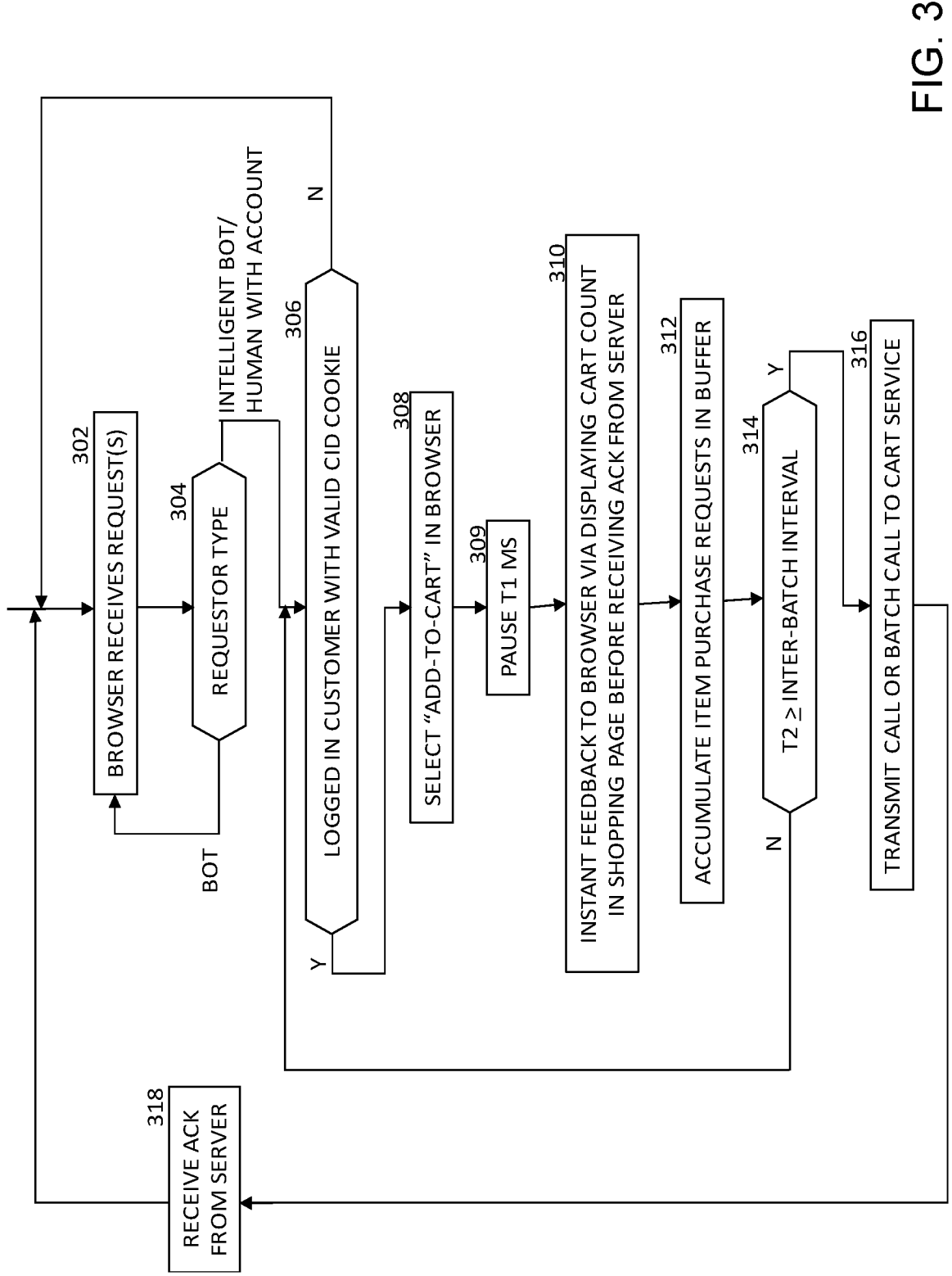
FIG. 3 is a flow chart of an exemplary method for adding one or more items to a customer's shopping cart.

FIG. 3 is a flow chart of an exemplary method performed in a client processor 101 (FIG. 1) for providing immediate feedback to a user 103, 104 interacting with the database 109.

At step 302, the browser 106 receives a request to purchase a first item. For example, the user 103 visits an online store having a catalog of items available for purchase from a seller. The catalog is rendered from a website associated with the seller, and may be operated by the seller or a fulfillment house. In some embodiments, the catalog allows the user 103 to select multiple items for purchase at once. For example, the catalog may display a checkbox next to each available item, and permit the user to check a plurality of items and then select the ad-to-cart button once to add all of the plurality of checked items to the user's electronic shopping cart with a single add-to-cart click. The selection can be made using any input mechanism appropriate for the platform of the client computer, including clicking, tapping, using a keyboard, dragging and dropping, voice commands, gestures, or the like. Controls can include buttons, sliders, radio buttons, check boxes, a spinner, a drop-down list, or other widget.

At step 304, in some embodiments, the client processor 101 can apply a coarse filter to separate human users from bots. For example, in some embodiments, if the user (e.g., bot 102) cannot identify a Completely Automated Public Turing test to Tell Computers and Humans Apart (CAPTCHA), the user 102 is not permitted to use the shopping cart service 108, and execution returns to step 302. If the user can identify the CAPTCHA, execution proceeds to step 304. Alternatively, another form of filter to exclude bots can compare the rate at which the user submits requests to an empirically determined maximum number of requests per second a human can submit. If the user exceeds this maximum rate, then the user is assumed to be a bot, and can be excluded. By denying service to regular bots, the client 101 can avoid denial of service attacks from bots that attempt to flood the server 107 with requests. In alternative embodiments, the filter of steps 302 and 304 can be omitted.

At step 306, the client processor determines whether the user is logged into a valid account and the client processor has a valid CID cookie associated with the account. If the user is not logged in with a valid CID cookie on the client processor 101, the user is excluded and execution returns to step 302. If the user is logged in with a valid CID cookie on the client processor 101, execution passes to step 308.

At step 308, the client process selects (e.g., clicks or taps) the add-to-cart control (e.g., button) in the browser 106 to initiate the process of adding the item(s) to the shopping cart service application 108 in server 107.

At step 309, the agent 105 pauses for a first predetermined period T1 before accepting another request. The duration of interval T1 (e.g., 100 ms) may be selected to be short enough, so that the T1 delay does not affect the maximum rate at which a human can add additional items to the shopping cart. The interval T1 can be long enough to prevent an intelligent bot from completely filling the buffer 111 before the next batch request is transmitted to the shopping cart service 108.

At step 310, the agent 105 determines that the user has selected the add-to-cart control and generates immediate feedback for immediate display in the user interface (e.g., browser window) 113, without waiting for any acknowledgement from the shopping cart service application 108. The feedback can include an indication of the total number of items in the shopping cart 115 or a message 116 indicating that an item has successfully been added to the shopping cart. In some embodiments, the indication includes a first total number of items reflecting addition of the first item to the shopping cart of the user. The agent 105 causes the browser 106 to allow the user 103, 104 to leave the web page and return to shopping immediately, and the tasks associated with committing the request in the order database 109 are performed asynchronously in the background. These background tasks can include transmitting a request from the browser 106 to the shopping cart service application 108, accessing an inventory database 109 of the shopping cart service application 108 to determine whether the item is in stock, and if the item is in stock, the shopping cart service application 108 adds the item to a data structure representing the user's shopping cart. In some embodiments, the feedback is provided to the browser 106 before initiating transmission of the request from the client processor 101 to the server 107. At a subsequent time, the client processor 101 receives the acknowledgement of the transmitted request from the server, after displaying the indication by the browser.

At step 312, in some embodiments, the agent 105 causes the order requests to be accumulated in the buffer 111. According to some embodiments, instead of transmitting each order request immediately upon receipt by the browser 106 from the user 103, 104, the order requests can be accumulated for a second predetermined period of time, T2. The period T2 can be selected so as to improve performance of the shopping cart service 108, by reducing the frequency of requests or batches. For example, if empirical data show that a human user can select an item to add to the shopping cart in as little as 200 milliseconds (ms), the shopping cart service application 108 can be configured to process at least one item request or batch request every T2 milliseconds (e.g., 200 ms). The agent 105 can cause the browser 106 to accumulate requests for 200 ms before fetching the accumulated requests from the buffer 111, aggregating the requests into a batch request (order), and transmitting the batch request to the shopping cart service application 108. This ensures that the browser 106 does not degrade the performance of the shopping cart service application 108. buffer. Thus, there can be a short term mismatch between the rate at which items (requests) are added to, and removed from, the buffer 111. The pause T1 between add-to-cart requests accepted from a bot 104, and the reduction in the number of requests due to batching can be tuned by an administrator, so that the speed of order processing is increased, without increasing the number of accuracy errors. An "accuracy error" is defined herein as an instance where the agent 105 causes the browser 106 to indicate that the item is in stock and has been added to the user's cart, but the item is out of stock at the time the user checks out.

For example, if the agent 105 is configured to cause the browser 106 to insert a 100 ms pause (T1) to limit users 103, 104 to order one item every 100 milliseconds and cause the browser 106 to transmit a batch of items every 200 millisecond (T2), the overall system throughput is improved. Agent 105 allows the client processor 101 to handle orders from intelligent bots 104, allowing cost improvements for automated customers using bots 104, without opening the door to denial of service attacks by hostile regular bots 102. By varying the above input parameters, the administrator can find optimum values of T1 and T2, while minimizing the delay the user 103, 104 encounters between add-to-cart requests. For example, T1 can be set to a short enough time that a human user does not perceive any delay between clicking on the add-to-cart button and the user receiving feedback and the user is able to return to shopping without waiting for an acknowledgement from the shopping cart service 108.

At step 314, the agent 105 makes a determination whether the time T2 since the last batch request was transmitted to the shopping cart service application 108 is greater than or equal to the predetermined interval. If the time T is less than the predetermined interval, execution is transferred to step 306 to accept more add-to-cart requests from the user 103 or bot 104. If the time T is greater than or equal to the predetermined interval, execution passes to step 316.

At step 316, if one or more items have accumulated in the buffer 111, the browser 106 transmits the item request (if only one request has accumulated) or a batch of all the requests in the buffer 111 (if two or more requests have accumulated) to the shopping cart service application 108. Thus, the agent 105 assembles any requests in buffer 111 into a single batch, and periodically transmits a respective one of the batches.

At block 318, the browser receives an acknowledgement of receipt of the request or batch request by the shopping cart service 108, after the call (or batch call) is transmitted to the cart service, and after feedback is provided to the browser. The solid arrows from step 318 returns to step 302 to accept additional requests from the user 103 or bot 104.

Figure 4:
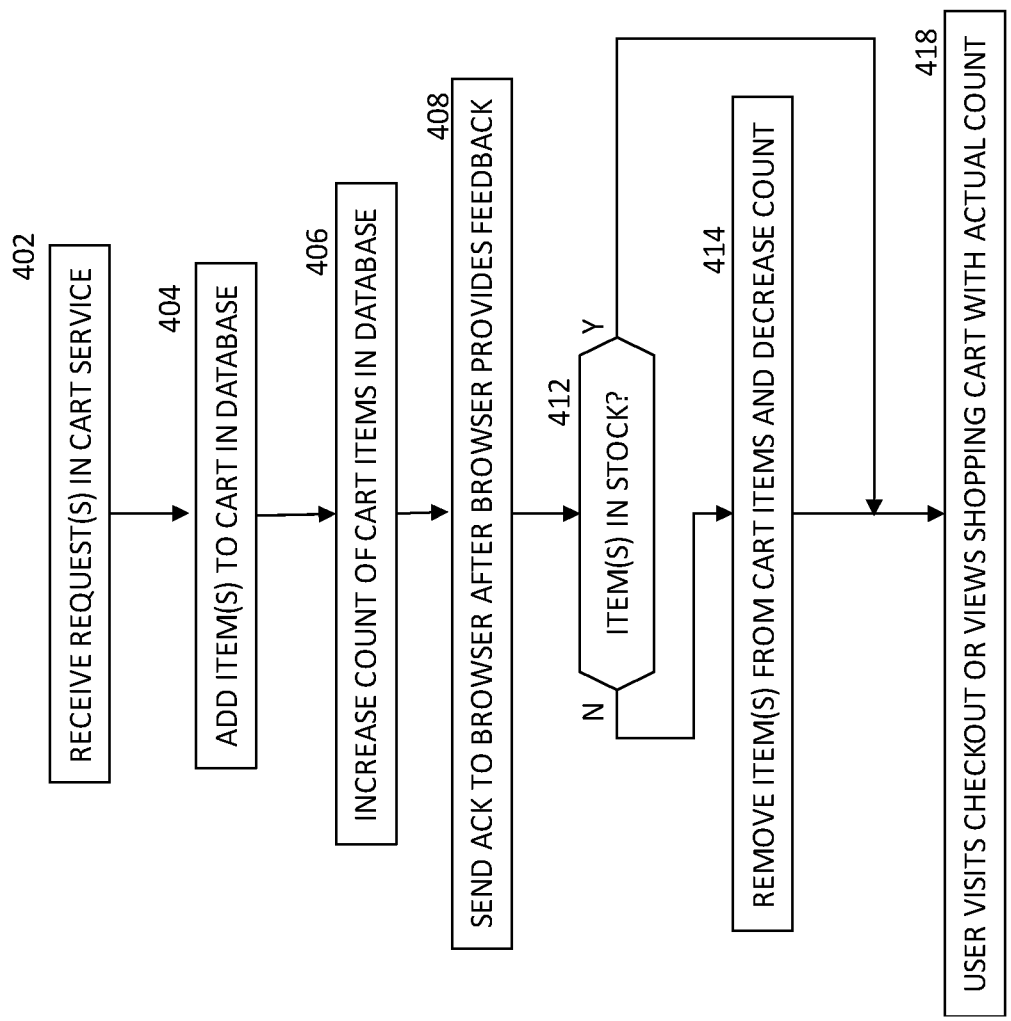
FIG. 4 shows an example of the shopping cart service application activity in response to the client actions shown in FIG. 3.

FIG. 4 is a flow chart of the method performed by the server 107 in response to the client processes described in FIG. 3. It is not necessary for the shopping cart service 108 to be altered to accommodate the client events shown in FIG. 3. In some embodiments, the method is implemented on the client side, so that the shopping cart service 108 can accommodate clients 103 using the method of FIG. 3 and legacy clients without batching.

At step 402, the server 107 receives a request in the shopping cart service application 108, from the browser 106. The request can be an individual request to purchase a single item or a batch request for purchasing a plurality of items.

At step 404, the shopping cart service application 108 adds the one or more items in the request (or batch request) to the electronic shopping cart in the database 109.

At step 406, the shopping cart service application 108 increases the count of items in the associated order in the database 109. Step 406 occurs after step 310 of FIG. 3.

At step 408, the shopping cart service application 108 sends an acknowledgement of the request to the browser 106. The acknowledgement can identify the current number of items in the user's electronic shopping cart, taking into account the request being received. According to one aspect, the browser 106 and agent 105 take no action in response to this acknowledgement. The browser continues to display the same number of items before and after receiving the acknowledgement, because the browser 106 has already updated the count of items displayed in the shopping cart icon 115 to reflect the request that the shopping cart service application 108 has just acknowledged.

At step 412 the shopping cart service application 108 determines whether the item(s) in the shopping cart is (are) in stock.

At step 414, if the item has sold out between the time the user placed the item in the electronic shopping cart and the time the user visits the checkout page or views the shopping cart, and the item is no longer available in stock, then the sold-out item is removed from the shopping cart in the server, and the actual count of items in the shopping cart 115 is reduced in the server to reflect removal of the sold-out items.

At step 416, if the item is still in stock when the user visits the checkout page or views the shopping cart, the display 112 shows the same number of items in the shopping cart.

At step 418, the user visits the checkout page or views the shopping cart. If an item has sold out between the time the item as added to the user's cart and the time the user visits the shopping cart or checks out, the displayed number of items in the cart is reduced at this time.

In some embodiments, a non-transitory, machine-readable storage medium is encoded with program instructions for execution by a processor, such that when the processor executes the program instructions, the processor performs a method as described above.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system comprising:
at least one processor having a browser configured to:
receive a request to purchase a first item;
in response to receiving the request, increase a count of cart items in a shopping cart displayed to a user;
transmit the request to a server at an end of a predetermined time interval; and
receive an acknowledgement of the transmitted request from the server after increasing the count of cart items displayed to the user.

2. The system of claim 1, wherein the processor further comprises an agent configured to:
in response to receiving the request by the browser, transmit a signal for causing the browser to increase the count to reflect addition of the first item to the shopping cart before transmitting the request from the browser to the server.

3. The system of claim 2, wherein the browser is further configured to continue to display the count of shopping cart items upon receiving an acknowledgement of the request from the server, until: a second item is added to the shopping cart, the browser visits the shopping cart, or a checkout process is initiated for the shopping cart.

4. The system of claim 2, wherein the agent is further configured to cause the browser to display a message that an item has been added to the shopping cart before the browser receives the acknowledgement.

5. The system of claim 2, further comprising a buffer for storing additional requests to purchase additional items, wherein the agent is configured to use the buffer to throttle a rate at which a batch reflecting items in the additional requests is transmitted from the browser to the server.

6. The system of claim 5, wherein the agent is configured to cause the processor to transmit all requests in the buffer to the server at the end of the predetermined time interval.

7. The system of claim 5, wherein the agent is configured to cause the browser to assemble a batch of requests, wherein the batch of requests includes one or more of the additional requests from the buffer, and the browser is configured to transmit the batch of requests to the server at the end of the predetermined time interval.

8. A method, comprising:
receiving a request to purchase a first item;
in response to receiving the request, increasing a count of cart items in a shopping cart displayed to a user;
transmitting the request to a server at an end of a predetermined time interval; and
receiving an acknowledgement of the transmitted request from the server after increasing the count of cart items displayed to the user.

9. The method of claim 8, wherein the count of cart items includes a first total number of items in the shopping cart, and increasing the count includes increasing the first total number of items by one to reflect addition of the first item to the shopping cart of the user.

10. The method of claim 8, wherein the browser continues to display the first total number of items upon receiving an acknowledgement of the request from the server.

11. The method of claim 8, wherein increasing the count of cart items causes the browser to display that the first item has been added to the shopping cart of the user.

12. The method of claim 8, further comprising throttling a frequency at which requests to purchase additional items are transmitted from the browser to the server.

13. The method of claim 12, wherein the throttling includes storing the additional requests in a buffer, and transmitting a batch request corresponding to the additional requests to the server processor at a different rate from a rate of the storing.

14. The method of claim 12, further comprising assembling the additional requests and the request into a batch, transmitting the batch at the end of the predetermined time interval.

15. A non-transitory, machine-readable storage medium encoded with program instructions for execution by a processor, such that when the processor executes the program instructions, the processor performs a method, comprising:
receiving a request to purchase a first item;
in response to receiving the request, increasing a count of cart items in a shopping cart displayed to a user;
transmitting the request to a server at an end of a predetermined time interval; and
receiving an acknowledgement of the transmitted request from the server after increasing the count of cart items displayed to the user.

16. The non-transitory, machine-readable storage medium of claim 15, wherein the count of cart items includes a first total number of items in the shopping cart, and increasing the count of cart items includes increasing the first total number of items by one to reflect addition of the first item to the shopping cart of the user.

17. The non-transitory, machine-readable storage medium of claim 16, further comprising instructions for causing the browser to continue to display the increased first total number of items upon receiving an acknowledgement of the request from the server.

18. The non-transitory, machine-readable storage medium of claim 15, further comprising instructions for causing the processor to throttle a frequency at which a batch request to purchase additional items is transmitted from the browser to the server.

19. The non-transitory, machine-readable storage medium of claim 18, wherein the throttling includes storing the request and additional requests in a buffer, and transmitting a batch reflecting the request and the additional requests to the server processor at the end of the predetermined time interval.

20. The non-transitory, machine-readable storage medium of claim 18, further comprising assembling the additional requests into one or more batches, and periodically transmitting a respective one of the batches based at least in part on the predetermined time interval.

* * * * *